Patented Dec. 24, 1940

2,225,633

UNITED STATES PATENT OFFICE 2,225,633

METHOD FOR PRODUCING COMPOUNDS OF BARIUM AND STRONTIUM

Lyle O. Hill and Sampson Isenberg, Chicago, Ill.; said Isenberg assignor of six per cent to said Hill and twenty per cent to McLaughlin & Wallenstein, a firm consisting of John J. McLaughlin and Sidney Wallenstein No Drawing. Application February 17, 1938, Serial No. 191,001

17 Claims. (Cl. 23—186)

Our invention relates in general to the treatment of barium and strontium compounds. It relates more in particular to the preparation of compounds of barium and strontium, specifically their hydroxides and oxides, from naturally occurring sulfates thereof.

Compounds of barium and strontium are used extensively in many industries, and the sources of raw materials, particularly the barite and celestite ores, are relatively widely distributed. Notwithstanding these facts, the compounds such as the soluble salts and hydroxides, oxides and peroxides thereof are still relatively expensive, principally because no fully satisfactory processes have been known for the treatment of ores to convert them to usable products. In the further consideration of the subject, barium may be considered as more or less illustrative of the state of the art with respect to both metals.

The principal compounds of barium employed are barium sulfate, barium carbonate and barium hydroxide, although barium oxide is now fast becoming an important compound as well. Barium sulfates, usually employed as pigments, must be in relatively finely divided form, and processes are employed for producing the relatively pure sulfate from ores. Barium carbonate is found native, although adequate amounts of high purity products have not been discovered. The ordinary processes employed when the carbonate is to be used start with the sulfate, but such processes have not been fully satisfactory, principally because of the high temperatures employed and the number of steps required with the accompanying expense. Furthermore, relatively pure sources of barium sulfate must be used to produce relatively pure carbonate in a fully satisfactory manner. Other compounds of barium are usually produced from the carbonate, such production requiring first the formation of the oxide at relatively high temperatures, and then the treatment of the oxide to produce the salt desired. It is obvious, therefore, that great advantages will be secured by producing the hydroxide or oxide directly by a relatively inexpensive process, particularly since the hydroxide and oxide are used to a considerable extent and also since other compounds desired, such as the carbonate, are readily produced from the oxides or hydroxides.

The principal object of our invention is the provision of improved methods for treating compounds of barium and strontium.

Another object is the provision of improved methods for producing the hydroxides of barium or strontium from naturally occurring ores or other available salts.

A further object is the provision of improved methods for producing compounds of barium and strontium from sulphates thereof such that costs are decreased and such compounds are made more available for the industries which employ them.

Other specific objects and features of the invention will be made clear as the description thereof progresses.

For convenience in describing the invention, we shall first refer to the treatment of barium compounds and thereafter explain the similarity of the treatment for strontium compounds. The methods employed are substantially entirely identical in the two cases as further description will illustrate.

We have discovered that barium compounds, specifically barium sulphate, may be dissolved in the hydroxides of the alkali metals, and also in oxides and peroxides of such metals. We have also discovered that, by the use of suitable solvents, a solid solution of barium sulfate in the alkali metal hydroxide may be treated to selectively dissolve therefrom the desired barium hydroxide so that good yields of barium hydroxide may be obtained when the process is adequately controlled. The solvent employed is of a type readily distilled off so that it may be re-used, and the remaining product is a substantially pure barium hydroxide or barium oxide which may be used as such or which may be further treated to produce other desired compounds, as, for example, by treatment with the usual acids which form salts of barium. Under certain circumstances, it may be desirable to treat the barium hydroxide in the solution in which it is recovered by suitable acid to produce the salt, and the extracting solvent is then suitably removed therefrom.

This solvent action of the alkali metal hydroxides (which for convenience we shall consider only in describing specific aspects of the invention) can be taken advantage of in many ways in the treatment of barium compounds, as a single example will illustrate. Barytes may be dissolved in sodium hydroxide at a temperature of 350 to 400 degrees C., either with or without the addition of other fluxes or catalytic agents such as sodium nitrate, etc. When the fused mass is cooled, it may be placed in water and barium sulphate in the form of a very fine slime is precipitated out of the water solution. The barium sulphate is then filtered and washed free of the sodium hydroxide or other salts present. By this method, a highly purified blanc fix is obtained suitable for use in the paint and other industries in which a sulfate is employed.

Our invention, however, is primarily concerned with the production of compounds of barium, such as the hydroxides, which heretofore have not been produced satisfactorily, in order to supply sources of this particular material at reasonable prices for use as such, or for further treatment for the production of substantially any of the usual compounds of barium, most of which are relatively simply prepared from the hydroxide. This phase of our invention will be made adequately clear by a consideration of the following specific examples:

*Example 1*

100 pounds of commercial flaked or stick sodium hydroxide are melted in a crucible such as an iron or steel crucible. Sodium hydroxide melts at about 318 degrees C., and we have found that a temperature in the neighborhood of 400 degrees C. is satisfactory for our purpose. 100 pounds of barytes (naturally occurring ore) are then gradually introduced with stirring into the fused mass of sodium hydroxide, taking care that the introduction be not rapid enough to disturb the fluidity of the sodium hydroxide. For convenience in handling, the barytes is preferably pre-heated to a temperature approaching the temperature of the fused sodium hydroxide. The barytes dissolves in the sodium hydroxide, producing a substantially clear solution of glasslike appearance. When this condition is attained, the mass is allowed to cool, preferably by pouring it into suitable receptacles prepared for the purpose. After cooling, the mass is broken up by a simple grinding operation and is then treated with 2000 pounds of a mixture of ethylene glycol and methanol in proportions of about three to one. Leaching is accomplished by passing the solvent slowly through the pulverulent mass until all of it has been treated with all of the solvent. The solvent may be passed through a number of times so that all of the extractible matter is dissolved in the solvent. The solvent is then evaporated in a closed system so that the solvent may be re-used. The residue is in the form of colorless to white substance which, on analysis, is determined to be a highly purified barium hydroxide substantially entirely free of any water of crystallization.

*Example 2*

100 pounds of commercial flaked or stick sodium hydroxide are melted in a crucible such as an iron or steel crucible. Sodium hydroxide melts at about 318 degrees C., and we have found that a temperature in the neighborhood of 400 degrees C. is satisfactory for our purpose. 100 pounds of barytes (naturally occurring ore) are then gradually introduced with stirring into the fused mass of sodium hydroxide, taking care that the introduction be not rapid enough to disturb the fluidity of the sodium hydroxide. For convenience in handling, the barytes is preferably pre-heated to a temperature approaching the temperature of the fused sodium hydroxide. The barytes dissolves in the sodium hydroxide, producing a substantially clear solution of glasslike appearance. When this condition is attained, the mass is allowed to cool, preferably by pouring it into suitable receptacles prepared for the purpose. After cooling, the mass is broken up by a simple grinding operation and is then treated with 2000 pounds of a mixture of ethylene glycol and methanol in proportions of about three to one. Leaching is accomplished by passing the solvent slowly through the pulverulent mass until all of it has been treated with all of the solvent. The solvent may be passed through a number of times so that all of the extractable matter is dissolved in the solvent. When the solvent has dissolved out and formed a solution of the extractable matter, it is treated with water. The barium hydroxide in solution thereby becomes hydrated, forming barium hydrate which then precipitates out of solution. The barium hydrate $(Ba(OH)_2.6H_2O)$ so obtained may be used as such, or may be employed in forming other compounds.

*Example 3*

150 parts of barytes are purified by the method referred to hereinabove, employing sodium hydroxide as a solvent for the barytes and precipitating pure barium sulphate out of the fused mass when cooled. 200 parts of the dried, purified barium sulphate produced by this method are dissolved in 100 parts of fused sodium hydroxide at a temperature of about 400 degrees C. When all of the barium sulfate has dissolved, the mass is removed from the crucible and allowed to cool to substantially room temperature. It is then broken up by grinding and treated with 4000 parts of a solvent consisting of three parts of methanol to one part of diethyleneglycol. When all of the extractable material has been removed by the action of the solvent, the solution is treated with 135 parts of concentrated hydrochloric acid (12 molar) dissolved in 400 parts of water. The solvent, including the water admixed therewith, is then evaporated and the residue is found to be a substantially pure barium chloride.

*Example 4*

100 parts of potassium hydroxide are fused at about 425 degrees C. and 150 parts of barytes are dissolved therein. 10 parts of potassium nitrate are introduced into the potassium hydroxide either before or after introduction of the barium sulfate. When a uniform mass has been produced, clearly shown by the appearance thereof, the product is allowed to cool and barium hydroxide is extracted by employing 4000 parts of a solvent consisting of equal parts of glycerol and methanol. When the solvent has been evaporated, the residue analyzes substantially pure barium hydroxide.

In carrying out the process as exemplified above, excellent yields may be obtained if care is employed in carrying out the process. It will be noted that in each case the molal ratio of hydroxide to barium sulfate is substantially greater than unity, so that theoretically it will be possible to obtain yields wherein substantially all of the barium ions are removed from the fused mass, leaving only alkali metal sulfate, alkali metal hydroxide and such impurities as might result from the presence thereof in the reacting materials employed. If care be not taken, however, to exclude moisture and particularly carbon dioxide, the yield is somewhat cut down. When carbon dioxide is present and allowed to come into contact freely with the fused mass, appreciable quantities of barium carbonate may be formed. Accordingly, for the best yields, we have found that carbon dioxide and water vapor should be excluded, this being readily accomplished in several ways known in the art which may readily be adapted to the types of equipment employed in carrying on our process.

The proportion of alkali metal hydroxide employed is not critical since barium sulfate is quite soluble in the fused sodium hydroxide, even in proportions substantially equivalent to the stoichiometric values of the two materials. Sodium hydroxide has a molecular weight of approximately 40 and barium sulphate approximately 233. Since two mols of sodium hydroxide are required to convert one mol of barium sulphate into the hydroxide, stoichiometric portions of the two materials are 80 to 233. While in general stoichiometric proportions of the two materials may be employed, we have found that we may obtain good results by employing a somewhat greater proportion of sodium hydroxide, as illustrated in the specified examples. It is to be understood, however, that the conditions of treatment employed, the total weight of materials and equipment used have a bearing upon the decision as to the exact proportions of sodium hydroxide and barium sulphate employed, and so we do not limit ourselves to any particular proportions providing the proportions are within the general range disclosed and may be effectively employed to produce our novel result.

Considerable latitude exists in the choice of the solvents and the treatment of the fused mass therewith. The type of solvent employed is one which will selectively dissolve a measurable proportion of the chemical compound desired but will not dissolve significant proportions of other compounds present. When sodium hydroxide and barium sulphate are employed, for example, a solvent should be used which will dissolve barium hydroxide but which will not dissolve appreciable amounts of barium sulfate or sodium sulfate. In general, the relative solubilities of these materials in the solvent may be determined by test of known samples of reagents; still there may be equilibria involved which may tend to retard the extraction of a potentially present compound even though that compound normally might be soluble in the solvent if not associated in the fused mass with other materials having greater solubilities. As an example, when sodium hydroxide and barium sulphate are employed, ethylene glycol, methanol, glycerol, mannitol and sorbitol will dissolve out the barium hydroxide without extracting appreciable quantities of other materials present. Of these solvents, ethylene glycol appears to be the most advantageous because of the greater ease in handling it and the fact that barium hydroxide is adequately soluble in it. We have found, however, that the use of a proportion of methyl alcohol in the ethyleneglycol produces somewhat better results than either material employed alone. We believe that the explanation for this fact is that the methanol decreases somewhat the viscosity of the ethyleneglycol and facilitates its functioning, although there may be other explanations for the result. While substantially any of these solvents may be employed alone, we have in general found that somewhat better results are often obtained by using a mixture.

The list of solvents is by no means complete, as other solvents may be selected which have the selective solvent action desired. Besides the mere functional aspects of the solvent, however, commercial cost, ease of recovering the solute therefrom and the like are factors to be taken into consideration. In general, some of the solvents which may be considered as derivatives of glycol and which may be employed are, for example, diethyleneglycol, methyl derivatives of ethylene and diethyleneglycol, dioxane and the like.

We have stated that the solvent employed should be one which will dissolve the barium or strontium hydroxide or oxide, but which is not a solvent for barium sulfate or alkali metal salts which may be present. However, it is obvious that a solution may be used which, in addition to the barium compound desired, may dissolve other compounds providing available methods are known for effecting a separation of such compounds from the barium or strontium hydroxide.

It is not essential that the barium hydroxide be extracted at any particular temperature, or in any particular state of sub-division. The fused mass when solidified is very easily broken up in substantially any usual type of pulverizing apparatus. We prefer to subdivide the fused mass after it has solidified to facilitate the action of the solvent. It is convenient to treat the material at a temperature around room temperature or not appreciably above, but with suitable control consistent with the boiling point of the solvent employed and other factors, the extraction may be effected at somewhat elevated temperatures. In large scale operation, a substantially continuous process may be employed, in which case the extraction may take place under pressure and at relatively elevated temperatures.

In the simplest method of carrying out our invention, the alkali metal hydroxide and barium sulphate only are placed in the fusion pot or reaction vessel, the fusion being effected at a relatively low temperature because of the solubility of the barium sulphate in fused sodium hydroxide. As suggested hereinabove, however, we may employ other alkali fluxes such as alkali metal salts where the control of the process and product produced indicates that such use would be advisable. For example, a relatively small amount of sodium nitrate may be used for oxidizing ferrous iron and other oxidizable substances so that they may be more easily removed. This feature may have its greatest utility in the first step of the process as employed in Example 2 hereinabove, that is to say, where a normally occurring barite ore is first purified to recover barium sulphate, and the barium sulphate so produced is either used as such or employed in subsequent steps of the process to convert it to the hydroxide or through the hydroxide to another salt of barium. These two aspects of the invention, however, may be combined in accordance with the following procedure:

Depending upon the control of the process, the proportions of sodium hydroxide and barium sulphate used, and the treatment with a solvent, significant proportions of barium sulphate and/or sodium hydroxide may remain in solid form after the treatment of the pulverized mass with the solvent. The remaining solid material may then be precipitated into water so that any barium sulphate present will be precipitated, and the sodium hydroxide present will go into solution. The sodium sulphate present will also be dissolved as well as other water soluble salts present which have been produced by the oxidizing action of the sodium nitrate. The barium sulphate produced may be washed with acid to remove acid soluble impurities, such as $Fe(OH)_3$, which may be present. The barium sulphate may be used as such or it may again be treated to convert it to the hydroxide form as desired. By suitable methods, the unreacted sodium hydroxide may, of course, be recovered and re-used. Thus it will be seen that the process is capable of several modifications, depending upon the character of the reacting materials utilized, the economies involved, and the final materials desired.

While the invention is principally concerned with the conversion of barium sulphate in its naturally occurring form, as in barite, it is not to be understood that our invention is limited to this particular conversion. An example will suffice to show the versatility of our process. Barium oxide has been suggested and is coming into use as an agent for the purification of iron. It is known that, if iron in a molten condition is passed through a path of molten barium oxide, substantially all of the impurities in the iron, except carbon, will be removed. The barium oxide, however, suffers considerable decomposition and picks up relatively large proportions of impurities. Various compounds of barium may in this manner be formed. Under most circumstances, the mixture of barium compounds resulting from this treatment may be purified or converted to the hydroxide form by the use of our process following substantially the same general treatment as described hereinabove.

We have described our invention primarily as it applies to the treatment of barium sulphate by the use of sodium hydroxide, although, in one of the specific examples illustrated, potassium hydroxide is used. We have found, however, that, as far as the functioning of our process is concerned, other hydroxides of the alkali metals may be used with substantially the same facility. Due to the much greater cost of the rare alkali metals, their use is not recommended under ordinary circumstances. The oxides and the peroxides of the alkali metals may also be employed in substantially the same manner as described for sodium hydroxide, in which case the barium compound obtained will correspond to the oxide or peroxide of the alkali metal used. We understand that some of the oxides and peroxides have a marked tendency to decompose when heated alone in an open vessel to temperatures sufficiently high to melt them, and so the practice of the invention by the use of the oxides and peroxides is subject to some limitation and should be undertaken with care and suitable precaution when the oxides or peroxides are used. Because of the relatively easy conversion of the hydroxide to the oxide and peroxide, however, and because of the cheapness and availability of sodium and potassium hydroxides, we have found that for most purposes the process is suitably carried on by the use of such reagents.

The use of strontium compounds in the industries has not been so widespread as the use of compounds of barium, the use being confined very largely to the pyro-technical industries. Many of the compounds of strontium, however, have substantially the same properties as corresponding compounds of barium and may, to a considerable extent, be employed for the same purposes. Strontium is not quite so prevalent in nature as barium but relatively large deposits of the mineral celestite ($SrSO_4$) are found. Our invention makes available at a relatively low price all of the compounds of strontium now conventionally made or having uses if available. In the treatment of strontium, substantially identical conditions and controls are utilized as described in connection with the preparation of the barium compounds. In general, the solvents for barium hydroxide are also solvents for strontium hydroxide. Strontium sulphate is also soluble in sodium hydroxide and other alkali metal hydroxides and oxides to substantially the same extent as barium sulphate is soluble. It may be precipitated in a substantially pure form from a water solution, as described in connection with the treatment of barium sulphate, or other salts of strontium such as the chloride or nitrate may be produced from the hydroxide by simple treatments with the corresponding acids. Accordingly, it appears unnecessary to describe in any detail the treatment of strontium salts or to illustrate the treatment by specific examples.

In addition to the treatment of the solution of barium or strontium hydroxide with acid, we may in many cases treat the solution with a corresponding anhydride to produce the salt. For example, if a solution of barium hydroxide in glycol be obtained, carbon dioxide may be bubbled through to form barium carbonate which precipitates out of solution in very finely divided form. This product is very suitable for use as a pigment in the paint and related industries.

In the above description and in the appended claims, we refer to the solubility of the barium or strontium salt in the fused alkali metal compound. It appears that a solution is actually formed and that the solution seems to persist in the solid state after cooling. Whether technically a solution is formed and persists in the solid state is of no importance so far as our invention is concerned, and such terms as "solution" and "solvent" are therefore not employed in a limiting sense, but to define the step of the process and its result whatever technically that result may be. Moreover, in the claims, where we speak of oxide, we mean to include the peroxides.

What we claim as new and desire to project by Letters Patent of the United States is:

1. The method of producing compounds of the class consisting of compounds of the metals barium and strontium which comprises fusing a mass of an alkali metal hydroxide, dissolving in the fused mass of alkali metal hydroxide a compound of the class consisting of barium sulphate and strontium sulphate, and treating the resulting mass with a solvent for the hydroxide of the metal, the sulphate of which was dissolved in said alkali metal hydroxide.

2. The method of producing compounds of the class consisting of compounds of the metals barium and strontium which comprises dissolving in a fused mass of a compound of the class consisting of alkali metal hydroxides and oxides a compound of the class consisting of barium sulphate and strontium sulphate, and treating the resulting mass with a solvent for the hydroxide or oxide of the metal, the sulphate of which was dissolved in said alkali metal hydroxide.

3. In the preparation of compounds of the class consisting of compounds of the metals barium and strontium, the steps of dissolving a sulphate of one of said metals in a fused metallic compound of the class consisting of alkali metal hydroxides and alkali metal oxides, treating the resulting mass with a solvent for an oxide or hydroxide of the metal whose sulphate was dissolved in the fused metallic compound to dissolve said metal oxide or hydroxide, and recovering the dissolved compound from the resulting solution.

4. In the preparation of compounds of the class consisting of compounds of the metals barium and strontium, the steps of dissolving a sulphate of one of said metals in a fused metallic compound of the class consisting of alkali metal hydroxides and alkali metal oxides, treating the resulting mass with a solvent to form a solution of the oxide or hydroxide of the metal whose sulphate was employed, and distilling the solvent from the resulting solution to recover the compound dissolved therein.

5. In the preparation of compounds of the class consisting of compounds of the metals barium and strontium, the steps of dissolving a sulphate of one of said metals in a fused metallic compound of the class consisting of alkali metal hydroxides and alkali metal oxides, allowing the resulting mass to cool, breaking the mass to change it to substantially pulverulent form, and treating the resulting pulverulent mass with a solvent for an oxide or hydroxide of barium or strontium.

6. In the preparation of compounds of the class consisting of compounds of the metals barium and strontium, the steps of dissolving a sulphate of one of said metals in a fused metallic compound of the class consisting of alkali metal hydroxides and alkali metal oxides, allowing the resulting mass to cool, breaking the mass to change it to substantially pulverulent form, and treating the resulting pulverulent mass with a solvent for the oxides or hydroxides of barium or strontium, said solvents being of the class consisting of glycol, glycol derivatives, and a mixture of glycol and another solvent for the oxides or hydroxides of barium or strontium.

7. In the preparation of compounds of the class consisting of compounds of the metals barium and strontium, the steps of dissolving a sulphate of one of said metals in a fused metallic compound of the class consisting of alkali metal hydroxides and alkali metal oxides, allowing the resulting mass to cool, breaking the mass to change it to substantially pulverulent form, and treating the resulting pulverulent mass with a glycol to form a solution of a compound of the metal whose sulphate was dissolved in the fused mass.

8. In the preparation of compounds of the class consisting of compounds of the metals barium and strontium, the steps of dissolving a sulphate of one of said metals in a fused metallic compound of the class consisting of alkali metal hydroxides and alkali metal oxides, allowing the resulting mass to cool, breaking the mass to change it to substantially pulverulent form, treating the resulting pulverulent mass with a glycol to form a solution of a compound of the metal whose sulphate was dissolved in the fused mass, and evaporating the glycol.

9. The method of producing a compound of barium which comprises dissolving barytes in a fused mass of alkali metal hydroxide, cooling the mass, treating the mass to change it to pulverulent form, and treating the resulting pulverulent mass with a solvent for barium hydroxide.

10. The method of producing a compound of barium which comprises dissolving barytes in a fused mass of alkali metal hydroxide, cooling the mass, treating the mass to change it to pulverulent form, and treating the resulting pulverulent mass with a solvent for barium hydroxide, said solvent being a member of the class consisting of a glycol and a mixture of a glycol and another solvent, and evaporating off the solvent.

11. The method of producing a compound of barium which comprises dissolving barytes in a fused mass of alkali metal hydroxide, cooling the mass, treating the mass to change it to pulverulent form, and treating the resulting pulverulent mass with a solvent for barium hydroxide, said solvent being a member of the class consisting of a glycol and a mixture of a glycol and another solvent, and treating the barium hydroxide with an acid substance to form a salt of barium.

12. The method of producing a compound of barium which comprises dissolving barium sulphate in a fused mass of sodium hydroxide, cooling the mass, pulverizing the same, and treating the pulverized mass with a glycol to dissolve out barium hydroxide.

13. The method of producing a compound of barium which comprises dissolving barium sulphate in a fused mass of sodium hydroxide, cooling the mass, pulverizing the same, treating the pulverized mass with a glycol to dissolve out barium hydroxide, and treating the barium hydroxide with an acid substance to form a barium salt.

14. The method of preparing compounds of the class consisting of compounds of the metals barium and strontium, which comprises fusing a mass of an alkali metal hydroxide, excluding water and carbon dioxide, dissolving a sulphate of one of said metals in the fused mass while still excluding water and carbon dioxide, and treating the mass in the absence of water and carbon dioxide with a solvent for the hydroxide of the metal whose sulphate was dissolved in the fused mass of alkali metal hydroxide.

15. The method of producing barium hydroxide which comprises providing a fused mass of sodium hydroxide containing barytes dissolved therein, allowing the resulting mass to cool, pulverizing the same, and dissolving out the barium hydroxide with a solvent at least a substantial part of which comprises ethylene glycol.

16. The method of producing compounds of the class consisting of compounds of the metals barium and strontium which comprises fusing a mass of an alkali metal hydroxide, dissolving a sulphate of one of said metals in the fused mass of alkali metal hydroxide, treating the resulting mass with a solvent for the hydroxide of the metal whose sulphate was dissolved in the fused mass, and treating the resulting solution with water to convert the hydroxide of said metal into the hydrate form thereof.

17. The method of producing barium hydroxide which comprises providing a fused mass of sodium hydroxide containing barytes dissolved therein, allowing the resulting mass to cool, pulverizing the same, dissolving out barium hydroxide with a solvent at least a substantial part of which comprises ethylene glycol, and treating the resulting solution with water to precipitate out barium hydrate.

LYLE O. HILL.
SAMPSON ISENBERG.